US011166561B2

(12) United States Patent
Charboneau et al.

(10) Patent No.: US 11,166,561 B2
(45) Date of Patent: Nov. 9, 2021

(54) LOCKING POSITIONING PIN

(71) Applicant: Allsalt Maritime Corporation, Victoria (CA)

(72) Inventors: Daniel Bennett Charboneau, Victoria (CA); Mark Leighton Foster, Victoria (CA); Daryl Peter Peereboom, Brentwood Bay (CA); Ryan David Lee, Victoria (CA)

(73) Assignee: Allsalt Maritime Corporation, Victoria (CA)

( * ) Notice: Subject to any disclaimer, the term of this patent is extended or adjusted under 35 U.S.C. 154(b) by 0 days.

(21) Appl. No.: 17/037,185

(22) Filed: Sep. 29, 2020

(65) Prior Publication Data

US 2021/0093093 A1    Apr. 1, 2021

Related U.S. Application Data

(60) Provisional application No. 62/908,454, filed on Sep. 30, 2019.

(51) Int. Cl.
| | |
|---|---|
| *A47B 9/00* | (2006.01) |
| *F16M 11/00* | (2006.01) |
| *A47C 7/50* | (2006.01) |
| *F16B 5/00* | (2006.01) |

(52) U.S. Cl.
CPC ............ *A47C 7/506* (2013.01); *F16B 5/0088* (2013.01)

(58) Field of Classification Search
CPC ............ A47C 7/506; A47C 7/004; A47C 3/20
See application file for complete search history.

(56) References Cited

U.S. PATENT DOCUMENTS

| | | | | |
|---|---|---|---|---|
| 4,113,221 A | * | 9/1978 | Wehner ................. | A47C 3/34 248/408 |
| 4,165,854 A | * | 8/1979 | Duly .................... | A47C 3/34 248/245 |
| 4,328,943 A | * | 5/1982 | Eldon, III ............ | A47C 3/03 248/578 |
| 5,243,921 A | * | 9/1993 | Kruse .................. | A47B 9/00 108/147 |
| 6,155,441 A | * | 12/2000 | Andersen ............. | A47B 47/021 211/192 |
| RE40,657 E | * | 3/2009 | Suh ..................... | E04H 15/46 135/114 |
| 7,980,519 B2 | * | 7/2011 | Chen ................... | A47B 9/14 248/125.8 |

(Continued)

*Primary Examiner* — Shin H Kim
(74) *Attorney, Agent, or Firm* — Oyen Wiggs Green & Mutala LLP

(57) ABSTRACT

A locking positioning pin assembly comprising a shaft extending between opposing first and second ends, a nut threadably engaged with the shaft and rotatable to thread along the shaft between a closed position relatively closer to the first end of the shaft and an open position relatively closer to the second end of the shaft, a knob having a plunger, the knob rotatable about the shaft to cause rotation of the nut. When the nut is in the open position, the knob is translatable to allow the plunger to move between a disengaged position and an engaged position. When the nut is in the closed position, the plunger is in an engaged position and is prevented from translating relative to the nut and the shaft due to abutment of the knob with one or more features of the nut.

20 Claims, 8 Drawing Sheets

(56) References Cited

U.S. PATENT DOCUMENTS

| | | | | |
|---|---|---|---|---|
| 8,328,454 B2* | 12/2012 | McAndrews | .......... | B62K 19/18 |
| | | | | 403/109.7 |
| 9,234,375 B1* | 1/2016 | Horng | .................. | G06F 1/1681 |
| 2008/0156962 A1* | 7/2008 | Chen | ........................ | A47B 9/14 |
| | | | | 248/653 |
| 2012/0091299 A1* | 4/2012 | Levine | ..................... | F16M 7/00 |
| | | | | 248/188.4 |
| 2013/0336719 A1* | 12/2013 | Baus | ........................ | F16B 2/16 |
| | | | | 403/379.5 |
| 2015/0123446 A1* | 5/2015 | Gingras | .................. | A61G 5/10 |
| | | | | 297/411.26 |
| 2015/0328079 A1* | 11/2015 | Liles | ........................ | A61H 3/04 |
| | | | | 280/47.34 |
| 2018/0125233 A1* | 5/2018 | Leier | ..................... | A47B 17/02 |
| 2019/0387884 A1* | 12/2019 | Jacobs | .................. | A47C 1/121 |

* cited by examiner

LOCKING POSITIONING PIN

REFERENCE TO RELATED APPLICATIONS

This application claims priority to U.S. application No. 62/908,454 filed 30 Sep. 2019 which is hereby incorporated herein by reference.

TECHNICAL FIELD

This application relates to a locking positioning pin assembly for indexing and positioning various components relative to one another. Some embodiments are operative to position a footrest of a chair.

BACKGROUND

There is a wide range of situations where it is necessary to index and/or position a first component (typically a stationary component) relative to a second component (typically a moveable component). Such situations include exercise equipment (e.g. for setting the height of a seat or pedestal), chairs (e.g. for adjusting the length of chair legs, the position of a footrest, the position of a headrest or the like) and industrial equipment (e.g. for setting the position of various equipment and/or components).

It is known to employ a clevis pin for positioning a first component relative to a second component. The clevis pin may be passed through a first aperture in the first component and a second aperture in the second component to fix the first and second components relative to one another. A clevis pin may be locked in place by a cotter pin that prevents withdrawal of the clevis pin from the first or second apertures. However, the combination of a clevis pin and cotter pin is slow and cumbersome to install and leads to inefficient indexing and/or positioning of the first and second components. Further, it is common for the cotter pin to become lost or damaged through repeated use. Further still, the clevis pin and cotter pin typically allow undesirable play (e.g. movement) between one or more of the clevis pin, the cotter pin, the first component and the second component.

Another solution employed for positioning a first component relative to a second component is a spring-loaded pin. The spring-loaded pin may be affixed to the first component and biased to protrude from the first component (or through a first aperture of the first component) into a second aperture of the second component when the second aperture is aligned with the spring-loaded pin. To allow relative movement between the first and second components, the pin may be withdrawn from the second aperture by applying a force to overcome the bias of the spring. However, the spring-loaded pin is susceptible to accidental withdrawal from the second aperture which can result in undesirable movement between the first and second components. Further, the spring-loaded pin design commonly allows for undesirable play (e.g. movement) between one or more of the clevis pin, the cotter pin, the first component and the second component.

There is a general desire for improved positioning devices employed for indexing and/or positioning a first component relative to a second component.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides position adjustment mechanism. The position adjustment mechanism comprises a first component and a second component. The first component defines a track aperture extending in a first direction and a plurality of receiver cutouts spaced apart along the track aperture wherein each of the plurality of receiver cutouts has a second direction width that is larger than a second direction width of the track aperture, the second direction orthogonal to the first direction. The second component is selectively fixable relative to the first component by a locking positioning pin assembly. The locking positioning pin assembly comprises a shaft, a nut and a knob. The shaft is attached to the second component at a first end of the shaft, the shaft protrudes through the track aperture, the shaft has a second end opposite the first end and the shaft is translatable in the first direction within the track aperture to allow translation of the second component relative to the first component in the first direction. The nut is threadably engaged with the shaft and rotatable to thread along the shaft between a closed position relatively closer to the first end of the shaft and an open position relatively further from the first end of the shaft. The knob is rotatable about the shaft to cause rotation of the nut. When the nut is in the open position, the knob is translatable relative to the shaft and the nut to allow a plunger to move between a disengaged position relatively further from the first end of the shaft and an engaged position relatively closer to the first end of the shaft. When the nut is in the closed position, the plunger is forced into an engaged position and is prevented from moving into the disengaged position due to abutment of one or more features of the knob with one or more features of the nut. When the plunger is in the engaged position and the plunger protrudes into one of the plurality of receiver cutouts, abutment of the plunger with one or more edges of the one of the plurality of receiver cutouts prevents relative movement of the first component and the second component.

In some embodiments, the first component comprises a chair and the second component comprises a foot rest.

In some embodiments, the locking positioning pin assembly comprises a biasing member to bias the plunger into the engaged position. In some embodiments, when the nut is in the open position and the locking positioning pin assembly is aligned with the one of the plurality of receiver cutouts, the biasing member biases the plunger into the one of the one or more receiver cutouts. In some embodiments, when the nut is in the open position, the plunger may be translated into the disengaged position to allow relative movement between the first and second components by applying a force to the knob that overcomes the bias of the biasing member.

In some embodiments, the receiver aperture extends entirely through the second component in a third direction orthogonal to the first and second directions and at least one of the plurality of receiver cutouts does not extend entirely through the second component in the third direction.

In some embodiments, the plunger is integral with the knob. In some embodiments, the plunger is rotatable about the shaft independently of rotation of the knob. In some embodiments, a cross-section of the plunger in a plane defined by the first and second directions is polygonal. In some embodiments, a cross-section of the plunger in a plane defined by the first and second directions is rectangular. In some embodiments, a cross-section of the plunger in a plane defined by the first and second directions is circular. In some embodiments, a cross-section of the plunger in a plane defined by the first and second directions is complementary to a cross section of at least one of the one or more receiver cutouts in the plane defined by the first and second directions.

In some embodiments, an exterior surface of the nut is complementary to an interior surface of the knob.

In some embodiments, the track aperture extends substantially in the first direction. In some embodiments, the track aperture extends partially in the first direction and partially in the second direction. In some embodiments, at least a portion of the track aperture is curved.

In some embodiments, the knob defines one or more windows which reveal operating instructions on the nut.

In some embodiments, the one or more features of the nut comprise one or more splines protruding in a radial direction away from the shaft. In some embodiments, the one or more features of the nut comprises a keyseat defined by an exterior surface of the nut for receiving at least a part of a key, wherein the key is also at least partially received in a corresponding keyway defined by an interior surface of the knob and the abutment of the key with the keyseat and the exterior surface of the nut prevents relative rotation between the nut and the knob.

Another aspect of the invention provides a locking positioning pin assembly comprising a shaft, a nut and a knob. The shaft extends in a first direction between first and second ends. The nut is threadably engaged with the shaft and rotatable to thread along the shaft between a closed position relatively closer to the first end of the shaft and an open position relatively further from the first end of the shaft. The knob is rotatable about the shaft to cause rotation of the nut. When the nut is in the open position, the knob is translatable relative to the shaft and the nut to allow a plunger to move between a disengaged position relatively further from the first end of the shaft and an engaged position relatively closer to the first end of the shaft. When the nut is in the closed position, the plunger is forced into an engaged position and is prevented from moving into the disengaged position due to abutment of one or more features of the knob with one or more features of the nut.

In some embodiments, the locking positioning pin assembly comprises a biasing member to bias the plunger into the engaged position.

In some embodiments, the plunger is integral with the knob. In some embodiments, the plunger is rotatable about the shaft independently of rotation of the knob. In some embodiments, a cross-section of the plunger in a plane orthogonal to the first direction is polygonal. In some embodiments, a cross-section of the plunger in a plane orthogonal to the first direction is rectangular. In some embodiments, a cross-section in a plane orthogonal to the first direction is circular.

In some embodiments, an exterior surface of the nut is complementary to an interior surface of the knob. In some embodiments, an exterior surface of the nut comprises one or more splines. In some embodiments, the knob defines one or more windows which reveal operating instructions on the nut.

In some embodiments, the one or more features of the nut comprise one or more splines protruding in a radial direction away from the shaft. In some embodiments, the one or more features of the nut comprises a keyseat defined by an exterior surface of the nut for receiving at least a part of a key, wherein the key is also at least partially received in a corresponding keyway defined by an interior surface of the knob and the abutment of the key with the keyseat and the exterior surface of the nut prevents relative rotation between the nut and the knob.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a locking positioning pin assembly operable to index and/or position a first component (typically, but not necessarily, a moveable component) relative to a second component (typically, but not necessarily, a stationary component).

Figure 1C:
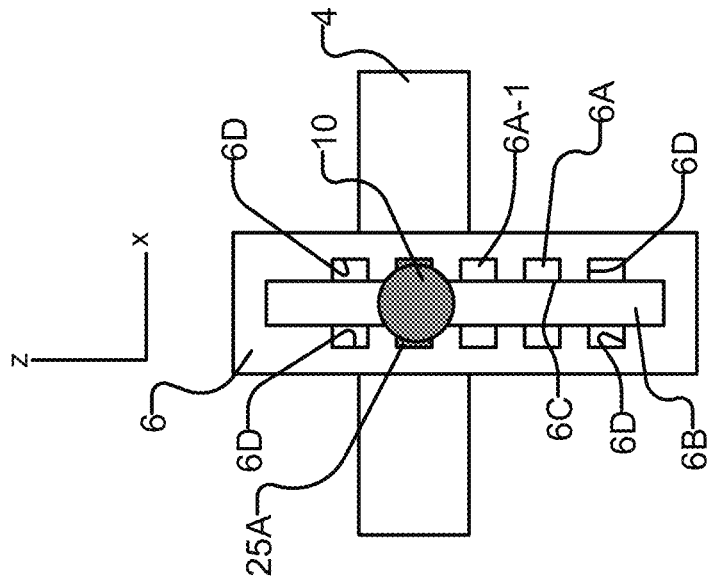
FIG. 1C is a schematic front view of the locking positioning pin assembly, the first component and the second component of FIG. 1A in another position.
Figure 1B:
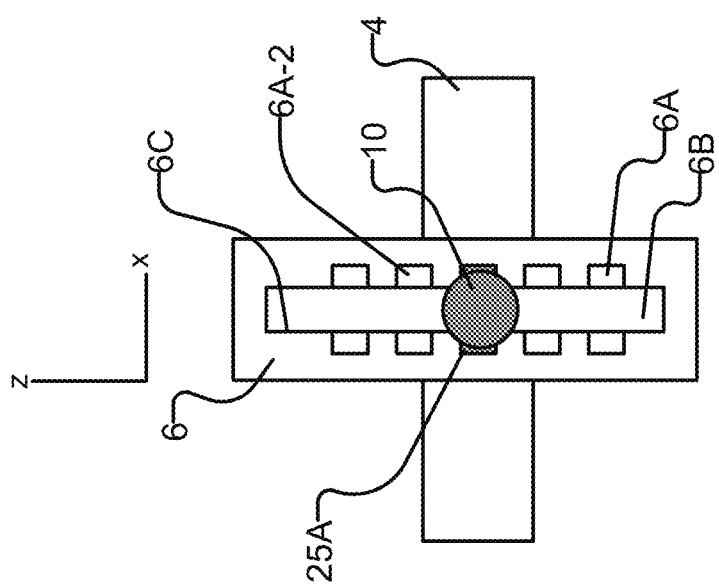
FIG. 1B is a schematic front view of the locking positioning pin assembly, the first component and the second component of FIG. 1A.
Figure 1A:
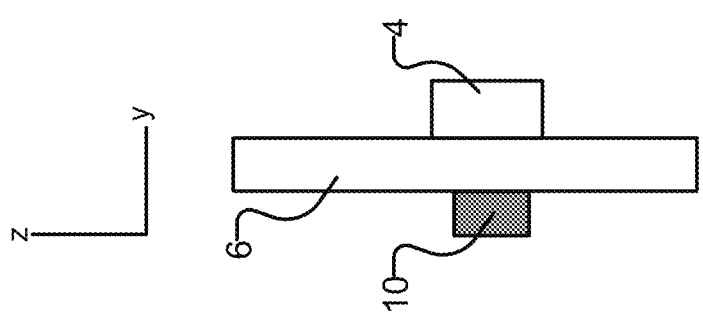
FIG. 1A is a schematic side view of a locking positioning pin assembly, a first component and a second component according to one exemplary non-limiting embodiment of the invention.

FIGS. 1A to 1C are schematic views of a locking positioning pin assembly 10 employed to fix a first component 4 (typically, but not necessarily, a moveable component) relative to a second component 6 (typically, but not necessarily, a stationary component). Together, locking positioning pin assembly 10, first component 4 and second component 6 form a position adjustment mechanism. FIGS. 1A and 1B show first component 4 fixed to second component 6 in a first position. FIG. 1C shows first component 4 fixed to second component 6 in a second position.

Locking positioning pin assembly 10 may be operable in a locked configuration, in which a plunger 25A of locking positioning pin assembly 10 engages a receiver aperture 6A of second component 6 to thereby fix (or substantially fix) first component 4 relative to second component 6, and an unlocked configuration, in which plunger 25A is dis-engageable from receiver cutout 6A. When plunger 25A is disengaged from receiver cutout 6A, at least a portion of locking positioning pin assembly 10 can slide (e.g. in the z-direction in FIGS. 1A-1C) in a track aperture 6B defined by second component 6 to allow first component 4 to move from a first position relative to second component 6 (e.g. as shown in FIG. 1B) to a second position relative to second component 6 (e.g. as shown in FIG. 1C).

In some embodiments, preventing (or substantially limiting) relative movement of first and second components 4, 6 comprises limiting translational movement (e.g. in the z-direction, x-direction and/or y-direction) and/or rotational movement (e.g. about the z-direction, x-direction and/or y-direction).

A track aperture 6B, defined by second component 6, confines relative movement of first and second components 4, 6 along the track (e.g. in the z-direction, in the illustrated embodiment). Although track aperture 6B is depicted as being straight, this is not necessary. Track aperture 6B could change directions along its length and/or be curved.

A plurality of receiver cutouts 6A are provided to engage plunger 25A of locking positioning pin assembly 10. Receiver cutouts 6A have a larger x-direction width than track aperture 6B. Plunger 25A may be complementary or partially complementary in shape to receiver cutouts 6A. In this way, in some embodiments, plunger 25A may be engageable to prevent (or substantially limit) relative movement between first and second components 4, 6 when locking positioning pin assembly 10 is aligned with one of receiver cutouts 6A (e.g. because plunger 25A does not fit within track aperture 6B when plunger 25A is not aligned with one of receiver cutouts 6A).

In some embodiments, to facilitate movement of locking positioning pin assembly 10 within track aperture 6B, receiver cutouts 6A have a y-direction dimension that is smaller than the x-direction dimension of track aperture 6B. This allows locking positioning pin assembly 10 to move within track aperture 6B without becoming undesirably lodged within a receiver cutout 6A.

In some embodiments, to facilitate movement of locking positioning pin assembly 10 within track aperture 6B, receiver cutouts 6A do not extend entirely through second component 6 (e.g. in the y-direction). In this way, locking positioning pin assembly 10 can smoothly move along uninterrupted edges 6C of track aperture 6B without being undesirably caught in a receiver cutout 6A. Nonetheless, plunger 25A may be able to protrude sufficiently far into receiver cutouts 6A to prevent (or substantially limit) relative movement of first and second components 4, 6.

Figure 2:
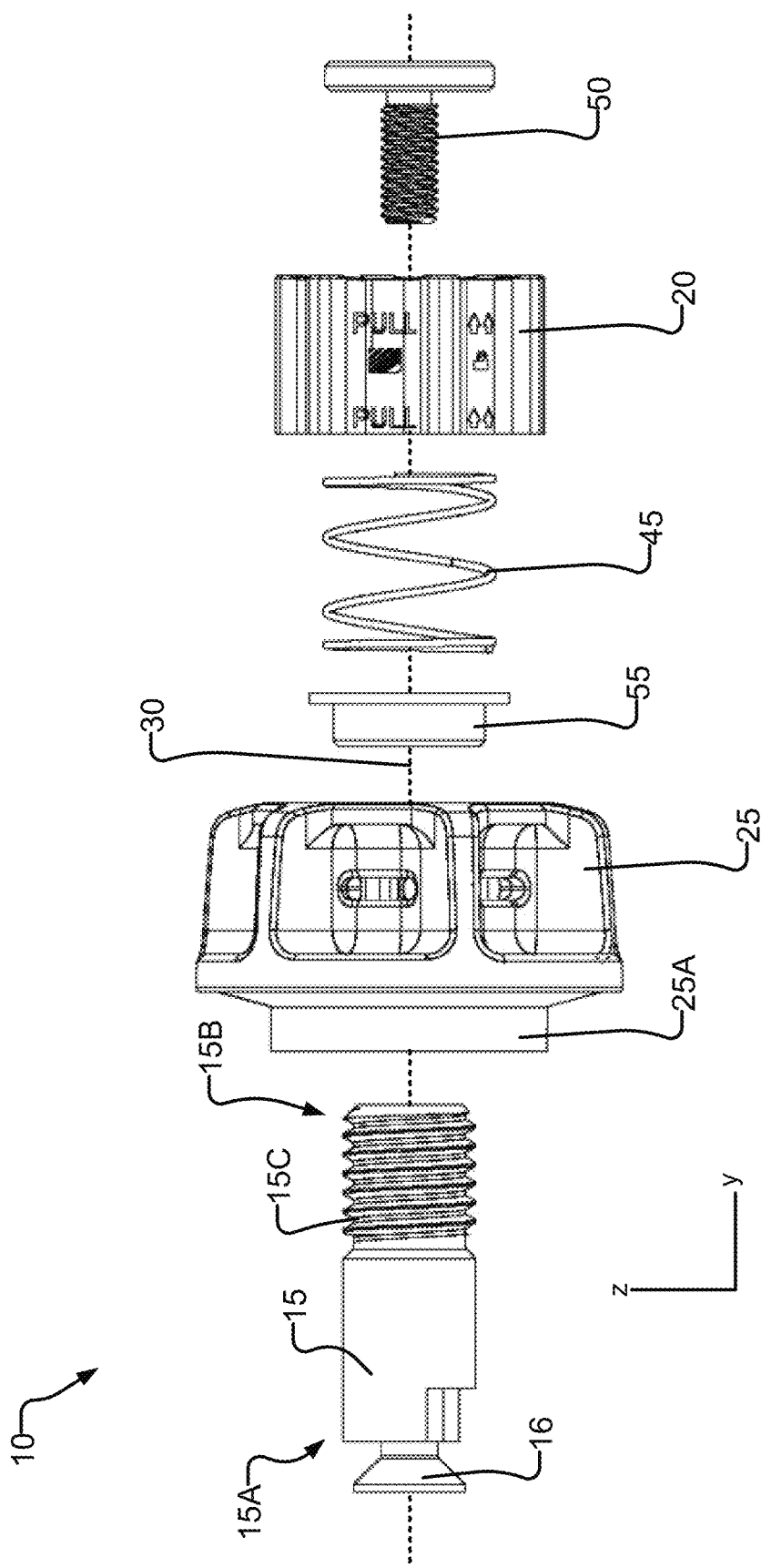
FIG. 2 is an exploded view of a locking positioning pin assembly according to one exemplary non-limiting embodiment of the invention.

FIG. 2 is an exploded view of an exemplary locking positioning pin assembly 10 according to one non-limiting embodiment of the invention. Locking positioning pin assembly 10 comprises a shaft 15, a nut 20 and a knob 25. Locking positioning pin assembly 10 optionally comprises a fastener 16, a biasing member 45, a fastener 50 and/or a washer 55.

Shaft 15 extends in the y-direction from a first end 15A to a second end 15B. Shaft 15 comprises threads 15C. Shaft 15 may be circular or substantially circular in cross-section. As will be discussed further herein, first end 15A of shaft 15 may be attachable to first component 4. For example, first end 15A may be attachable to first component 4 by fastener 16, by welding, or by other suitable means. In some embodiments, first component 4 is fixed to shaft 15 so that first component 4 cannot rotate relative to shaft 15.

Figures 3A, 3B:
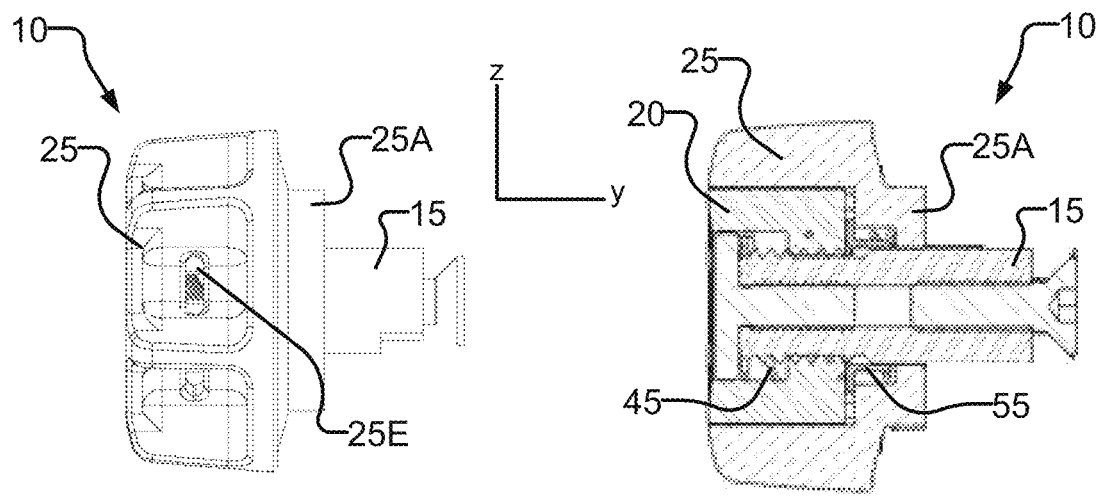
FIG. 3A is a side view of the locking positioning pin assembly of FIG. 2 in a locked configuration.
FIG. 3B is a side cross-sectional view of the locking positioning pin assembly of FIG. 2 in the closed/locked/engaged configuration.
Figures 3C, 3D:
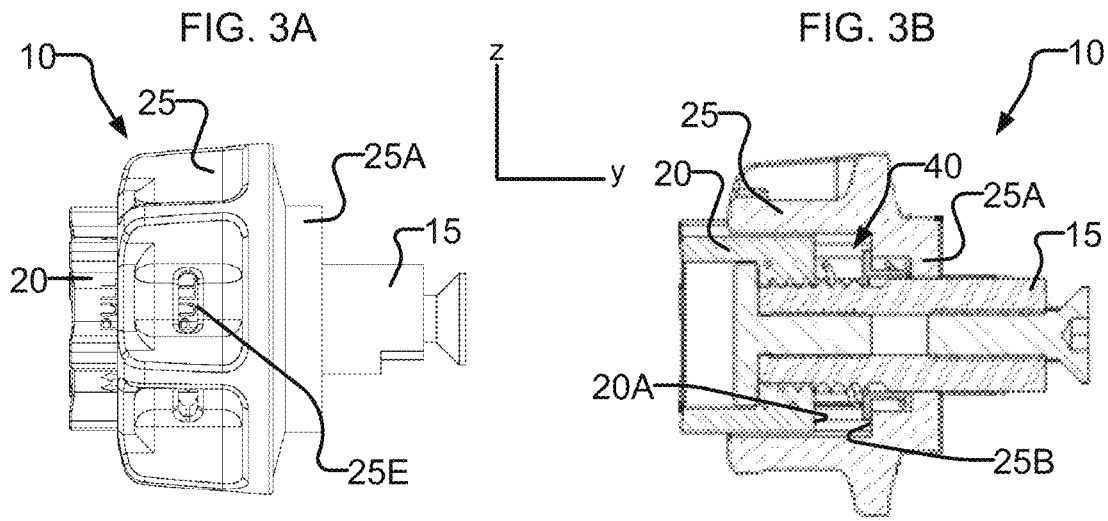
FIG. 3C is a side view of the locking positioning pin assembly of FIG. 2 in an open/engaged configuration.
FIG. 3D is a side cross-sectional view of the locking positioning pin assembly of FIG. 2 in the unlocked configuration.
Figures 3E, 3F:
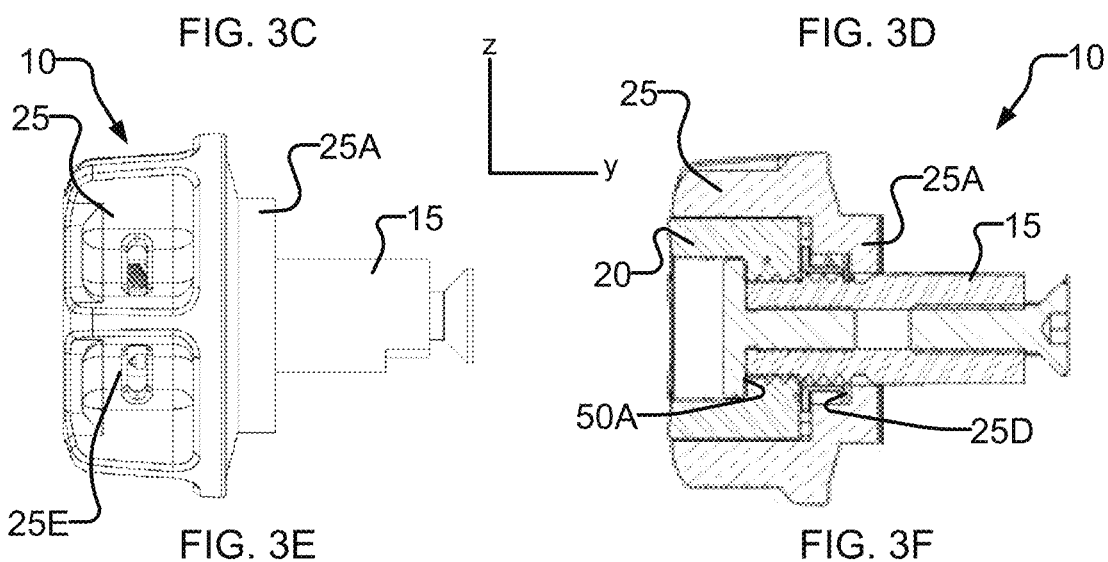
FIG. 3E is a side view of the locking positioning pin assembly of FIG. 2 in a disengaged configuration.
FIG. 3F is a side cross-sectional view of the locking positioning pin assembly of FIG. 2 in the disengaged configuration.
Figure 4A:
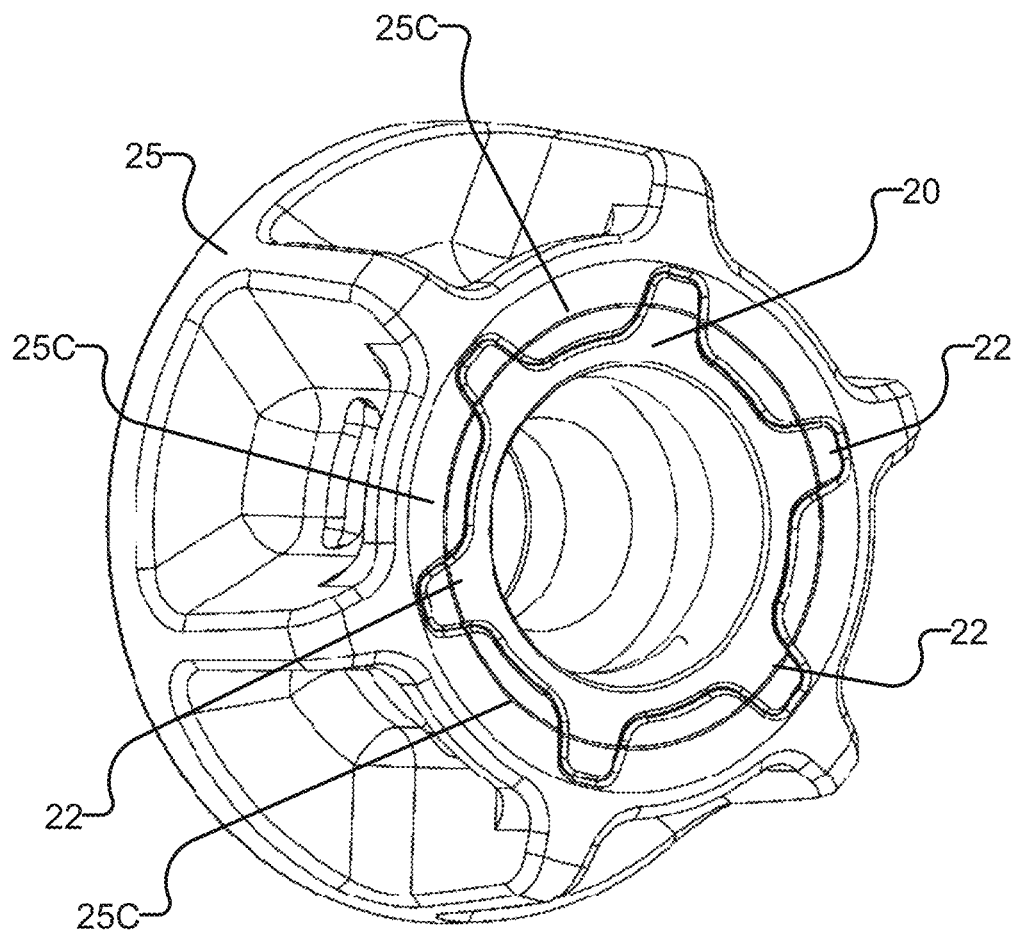
FIG. 4A is a perspective view of a knob and a nut of the locking positioning pin assembly of FIG. 2.
Figure 5A:
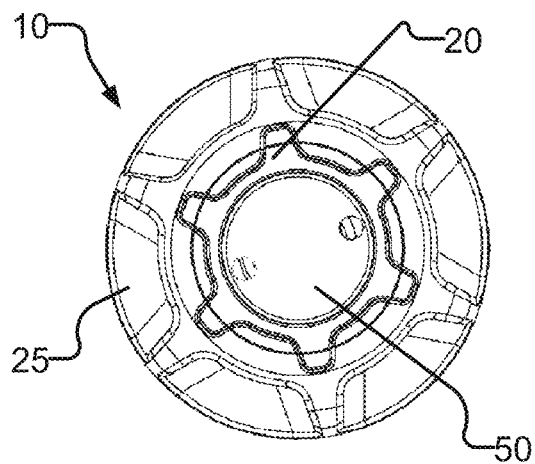
FIG. 5A is a front view of the locking positioning pin assembly of FIG. 2.
Figure 5B:
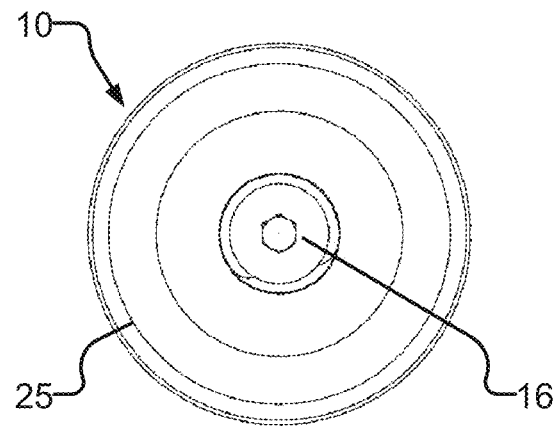
FIG. 5B is a back view of the locking positioning pin assembly of FIG. 2.
Figure 5C:
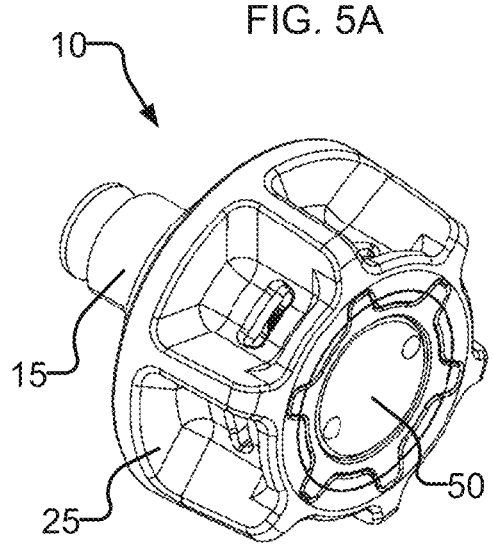
FIG. 5C is a perspective view of the locking positioning pin assembly of FIG. 2 in the closed/locked/engaged configuration.
Figure 5D:
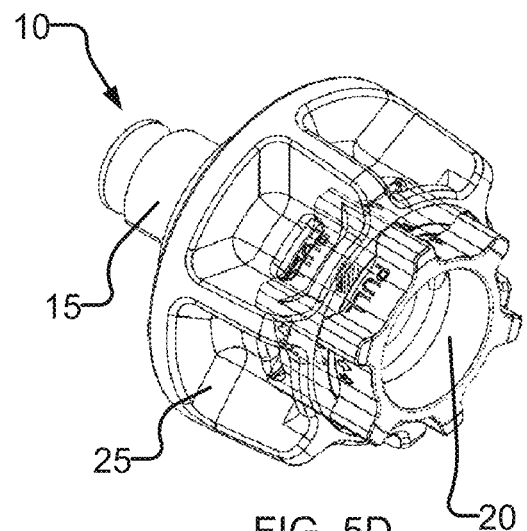
FIG. 5D is a perspective view of the locking positioning pin assembly of FIG. 2 in the open/engaged configuration.
Figure 5E:
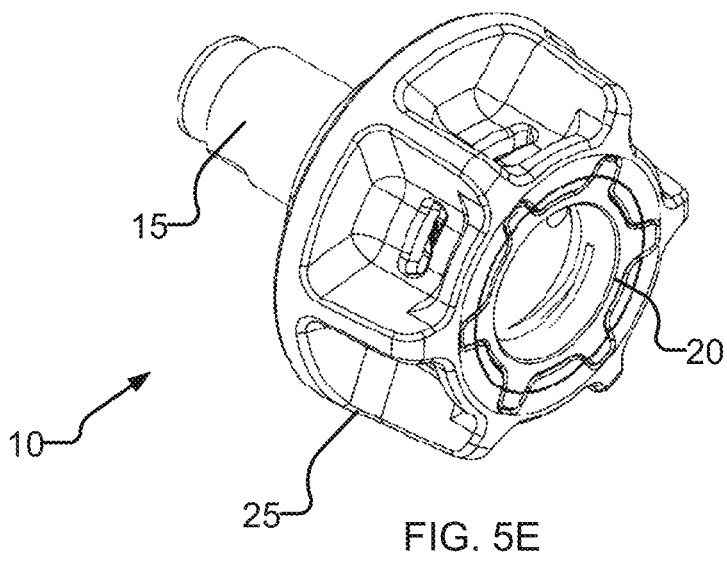
FIG. 5E is a perspective view of the locking positioning pin of FIG. 2 in the disengaged configuration.

Nut 20 is threadably engageable to threads 15C of shaft 15. By rotating nut 20 about a longitudinal axis 30 of shaft 15, nut 20 may be caused to travel in the y-direction along threads 15C between an open position spaced relatively further apart from first end 15A (shown in FIGS. 3C, 3D, 3E, 3F, 5D and 5E) and a closed position spaced relatively closer to first end 15A (shown in FIGS. 3A, 3B and 5C). Nut 20 may comprise one or more splines 22 which, for example, extend radially outwardly, as shown in FIGS. 4A and 5A. As can be seen from FIGS. 4A and 5A, nut 20 may comprise six splines 22. This is not mandatory, nut 20 may comprise more than or less than six splines. In other embodiments, nut 20 may be polygonal in shape (e.g. nut 20 may be hexagonal, pentagonal, rectangular, square, triangular, etc. in shape).

Nut 20 is preferably captive so that it cannot be unthreaded completely from shaft 15 in normal use. For example, the end of the threads 15C of shaft 15 may be enlarged. In the illustrated embodiment a fastener 50 is provided to prevent nut 20 from being unthreaded completely from shaft 15. Fastener 50 may be reverse-threaded (as compared to nut 20) to prevent undesired unthreading of fastener 50 by rotation of nut 20. Fastener 50 may serve to keep locking positioning pin assembly 10 in one piece so that components of locking positioning pin assembly 10 are not undesirably lost or damaged. In this way, fastener 50 may also prevent potentially unsafe conditions resulting from undesirable disengagement of locking positioning pin assembly 10.

Knob 25 is coupled to rotate with nut 20. In some embodiments, an interior shape of knob 25 is complementary, or at least partially complementary, to an exterior shape of nut 20. Due to abutment between an interior surface of knob 25 and an exterior surface of nut 20, when knob 25 is rotated about longitudinal axis 30, nut 20 is caused to rotate in the same direction around longitudinal axis 30. For example, one or more protrusions 25C of knob 25 may complement and/or abut one or more splines 22 of nut 20 such that when knob 25 is rotated about longitudinal axis 30, nut 20 is caused to rotate in the same direction (and at the same rate) about longitudinal axis 30. In this way, a user may rotate knob 25 to cause nut 20 to travel in the y-direction along threads 15C between the open position and the closed position.

While knob 25 may be constrained to rotate with nut 20 (when nut 20 is in the open position and the closed position), knob 25 may be allowed to translate in the y-direction relative to nut 20 when nut 20 is in the open position to allow plunger 25A to be disengaged from a receiver cutout 6A.

When nut 20 is in the open position, a gap 40 (shown in FIG. 3D) may be formed between a first end 20A of nut 20 and an interior shoulder 25B of knob 25. When gap 40 is formed, knob 25 may be allowed to translate in the y-direction between an engaged position (as shown in FIGS. 3C and 3D) and a disengaged position (as shown in FIGS. 3E and 3F). In the engaged position, plunger 25A can protrude (at least partially) into receiver cutout 6A of second component 6 as discussed further herein. In the disengaged position, plunger 25A is removed from receiver cutout 6A of second component 6.

In contrast, when nut 20 is in the closed position, there is no gap 40 (or gap 40 is relatively smaller) and abutment between first end 20A of nut 20 and interior shoulder 25B of knob 25 prevents translation of knob 25 in the y-direction into the disengaged position. In this way, when nut 20 is in the closed position and plunger 25A is aligned with a receiver cutout 6A, knob 25 is in a locked configuration wherein plunger 25A protrudes into receiver cutout 6A.

Figure 4B:
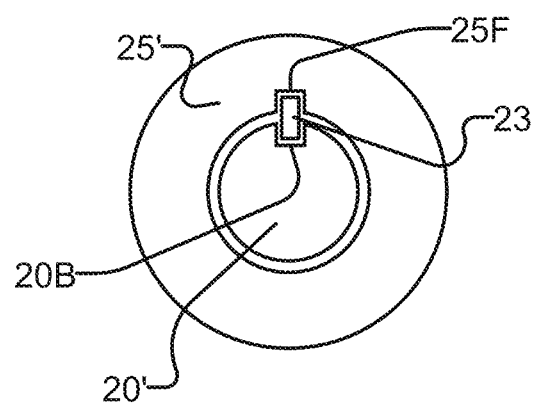
FIG. 4B is a schematic front view of a knob and a nut of another example of a locking positioning pin assembly according to one exemplary non-limiting embodiment of the invention.

In some embodiments, a key 23 may be provided between a nut 20' (substantially similar to nut 20 except as described below) and a knob 25' (substantially similar to knob 25 except as described below). Together nut 20', knob 25' and key 23 could replace nut 20 and knob 25'. For example, an exterior surface of nut 20' may define a keyseat 20B for receiving at least a portion of key 23 while an interior surface of knob 25' may define a keyway 25F for receiving a different portion of key 23, as depicted in FIG. 4B. Keyseat 20B may be complementary or complementary in part to key 23. Keyway 25F may also be complementary or complementary in part to key 23. When knob 25' is rotated, abutment of keyway 25F with key 23 may cause key 23 to rotate with knob 25' and abutment of key 23 with keyseat 20A may in turn cause nut 20' to rotate with knob 25'. Further, nut 20' may be allowed to translate in the y-direction by slipping between keyway 25F and key 23 and/or slipping between keyseat 20A and key 23. Key 23 may have any suitable cross-section. For example, key 23 may have a cross-section that is rectangular (as depicted), square, circular, triangular, hexagonal, t-shaped, I-shaped, etc. To prevent key 23 from leaving keyseat 20A or keyway 25F undesirably, a y-direction length of key 23 may be greater than a y-direction length of gap 40.

By threading nut 20 into the closed position, nut 20 may apply compressive forces on knob 25 (and other components of locking positioning pin assembly 10) to prevent undesirable vibration, rattling or movement of the components of locking positioning pin assembly 10 and/or first and second components 4, 6.

In some embodiments, a biasing member 45 is provided to bias knob 25 (and plunger 25A) in the y-direction toward first end 15A of shaft 15. Biasing member 45 may abut an inner end 25D of knob 25. In some embodiments, biasing member 45 may abut an inside surface 50A of fastener 50. Biasing member 45 may comprise a spring, elastomer, a magnet or the like.

In some embodiments, a washer 55 or a bushing is provided between biasing member 45 and shaft 15 to, for example, prevent biasing member 45 from getting caught in threads 15C of shaft 15.

When nut 20 is in the open position, biasing member 45 may bias knob 25 toward first end 15A of shaft 15 and/or into the engaged position. In this way, it may be unnecessary for a user to manually push plunger 25A into a receiver cutout 6A when plunger 25A is aligned with said receiver cutout 6A. This facilitates engagement of plunger 25A with receiver cutout 6A. To move knob 25 (and plunger 25A) into the disengaged position, a user may apply force to overcome the bias of biasing member 45 to move knob 25 (and plunger 25A) toward second end 15B of shaft 15 (as shown in FIGS. 3E and 3F). Even if nut 20 is unintentionally left in the open position or is otherwise in the open position, biasing member 45 provides a failsafe mechanism by biasing plunger 25A into the engaged position. Biasing member 45 may therefore reduce a risk of accidental disengagement of plunger 25A from receiver cutout 6A.

When nut 20 is in the open position, one or more instructions may be revealed or exposed. For example, in FIG. 3C, it can be seen that when nut 20 is in the open position, nut 20 protrudes out from under knob 25 and the instruction "pull" (e.g. pull knob 25 to disengage knob 25) is visible. Additionally or alternatively, knob 25 may define one or more windows 25E that may provide visual access to instructions printed (or etched, engraved, etc.) on nut 20 as shown in FIGS. 2 and 3A to 3C.

Plunger 25A may be shaped and sized to engage with (e.g. protrude into in whole or in part) receiver cutouts 6A of second component 6. In some embodiments, receiver cutouts 6A are circular or annular in cross-section and plunger 25A is circular or annual in shape. In some embodiments, plunger 25A is integral with knob 25. In some embodiments, plunger 25A is fixed to knob 25 such that y-direction translation of knob 25 causes y-direction translation of plunger 25A while plunger 25A is free to rotate independently of knob 25 (e.g. to facilitate aligning plunger 25A with receiver cutouts 6A. Since plunger 25A may be relatively larger in cross-section than shaft 15, plunger 25A may provide a larger load bearing surface as compared to traditional apparatus such as clevis pins and spring-loaded pins without requiring first component 4 to accommodate such a larger cross-section.

In practice, to adjust the position of first component 4 relative to second component 6 (assuming that locking positioning pin assembly 10 is in the locked configuration to start), a user would first rotate knob 25 to cause nut 20 to translate in the y-direction away from first end 15A of shaft 15 and into the open position, thereby forming gap 40. The user would then pull on knob 25 to move knob 25 in the y-direction away from first end 15A and disengage plunger 25A from receiver cutout 6A of second component 6. The user could then freely move first component 4 relative to second component 6 except as limited by the interaction of shaft 15 and track aperture 6B. For example, in the FIGS. 1B and 1C embodiment, second component 6 may be translated in the z-direction from a first receiver cutout 6A-1 to a second receiver cutout 6A-2.

Once locking positioning pin assembly 10 is aligned with second receiver cutout 6A-2, plunger 25A can be moved into the engaged position to protrude into receiver cutout 6A-2. Plunger 25A may be forced into the engaged position protruding into receiver cutout 6A-2 by biasing member 45 or manually by a user. A user may subsequently rotate knob 25 to move nut 20 in the y-direction toward first end 15A of shaft 15 into the closed position to close gap 40 and thereby lock knob 25 and plunger 25A in place. Abutment between plunger 25A and edges 6D of receiver cutout 6A prevent (or substantially limit) relative movement of first and second components 4, 6 when plunger 25A is in the engaged position protruding into a receiver cutout 6A.

Locking positioning pin assembly 10 may be employed, for example, in exercise equipment (e.g. for setting the height of a seat or pedestal), for chairs (e.g. adjusting the length of the legs, the position of a footrest, the position of a headrest or the like), as part of industrial equipment (e.g. for setting the position of various equipment and/or components) or otherwise.

Figure 6:
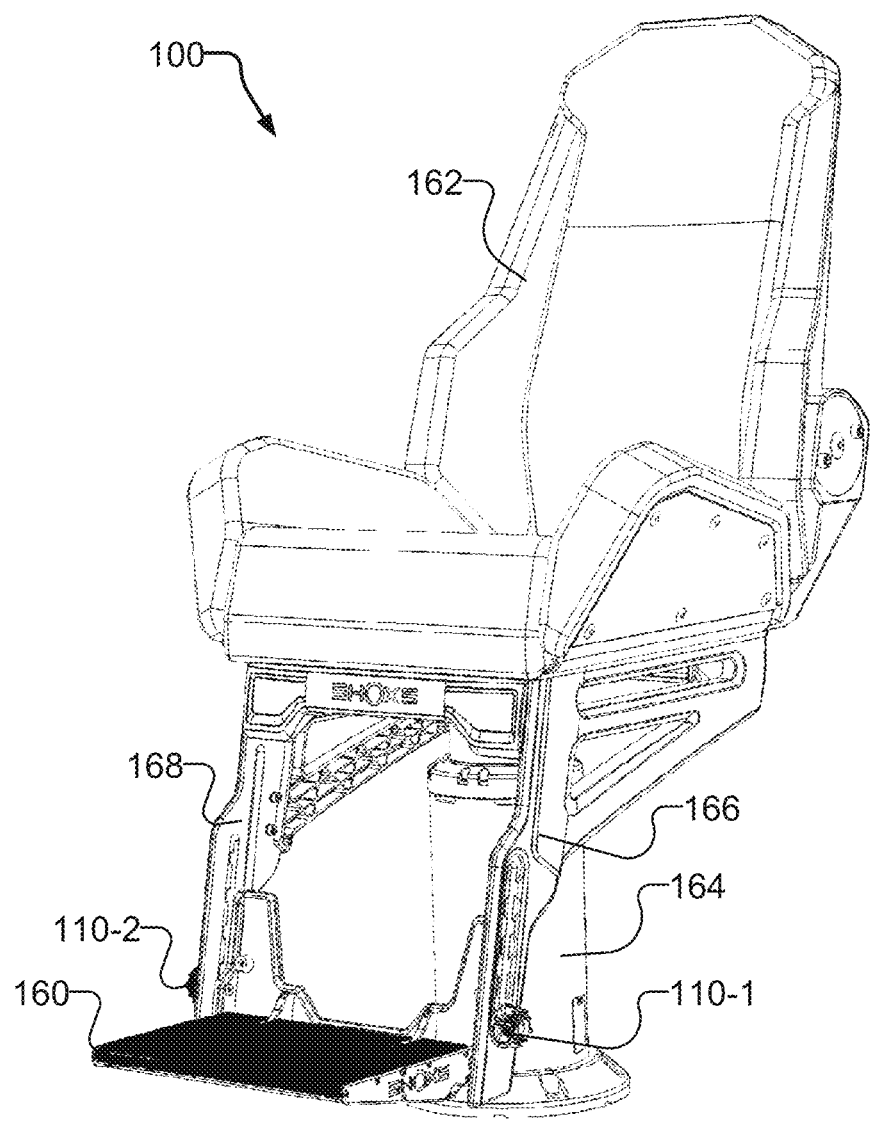
FIG. 6 is a perspective view of a chair with an adjustable footrest according to one exemplary non-limiting embodiment of the invention.
Figure 7:
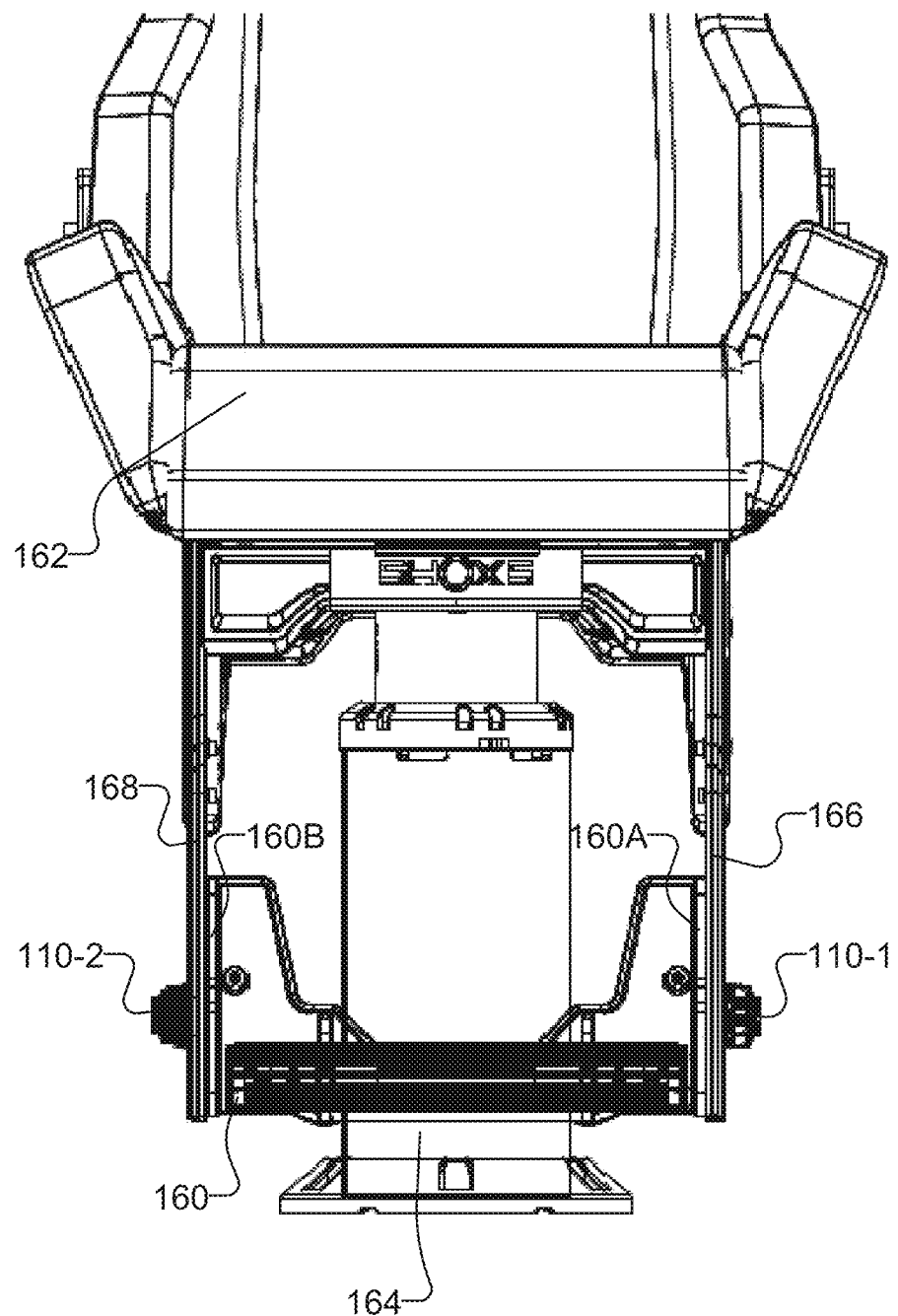
FIG. 7 is a magnified front view of a portion of the chair of FIG. 5.

Another aspect of the invention provides an adjustable footrest 160 for a chair 100. Chair 100 may comprise any suitable chair and it should be understood that footrest 160 may be provided with or without chair 100. As can be seen from FIG. 6, chair 100 comprises a seat 162 supported by a pedestal 164. In other embodiments, seat 162 may be supported by one or more legs or otherwise.

A first footrest support frame 166 and a second footrest support frame 168 support footrest 160. Footrest support frames 166, 168 may extend from seat 162, pedestal 164 or another portion of chair 100.

Footrest 160 is attached to first footrest frame 166 by a first locking positioning pin assembly 110-1. Locking positioning pin assembly 110-1 may be attached to a first support 160A of footrest 160 (e.g. by a fastener 16). Footrest 160 is attached to second footrest frame 168 by a second locking positioning pin assembly 110-2. Second locking positioning pin assembly 110-2 may be attached to a second support 160B of foot rest 160 (e.g. by a fastener 16).

Each of first and second locking positioning pin assemblies 110-1, 110-2 may be substantially similar to locking positioning pin assembly 10, described herein. First support 160A may have a similar role to first component 4 while first footrest frame 166 may have a similar role to second component 6. Similarly, second support 160B may have a similar role to first component 4 while second footrest frame 168 may have a similar role to second component 6.

Figure 8:
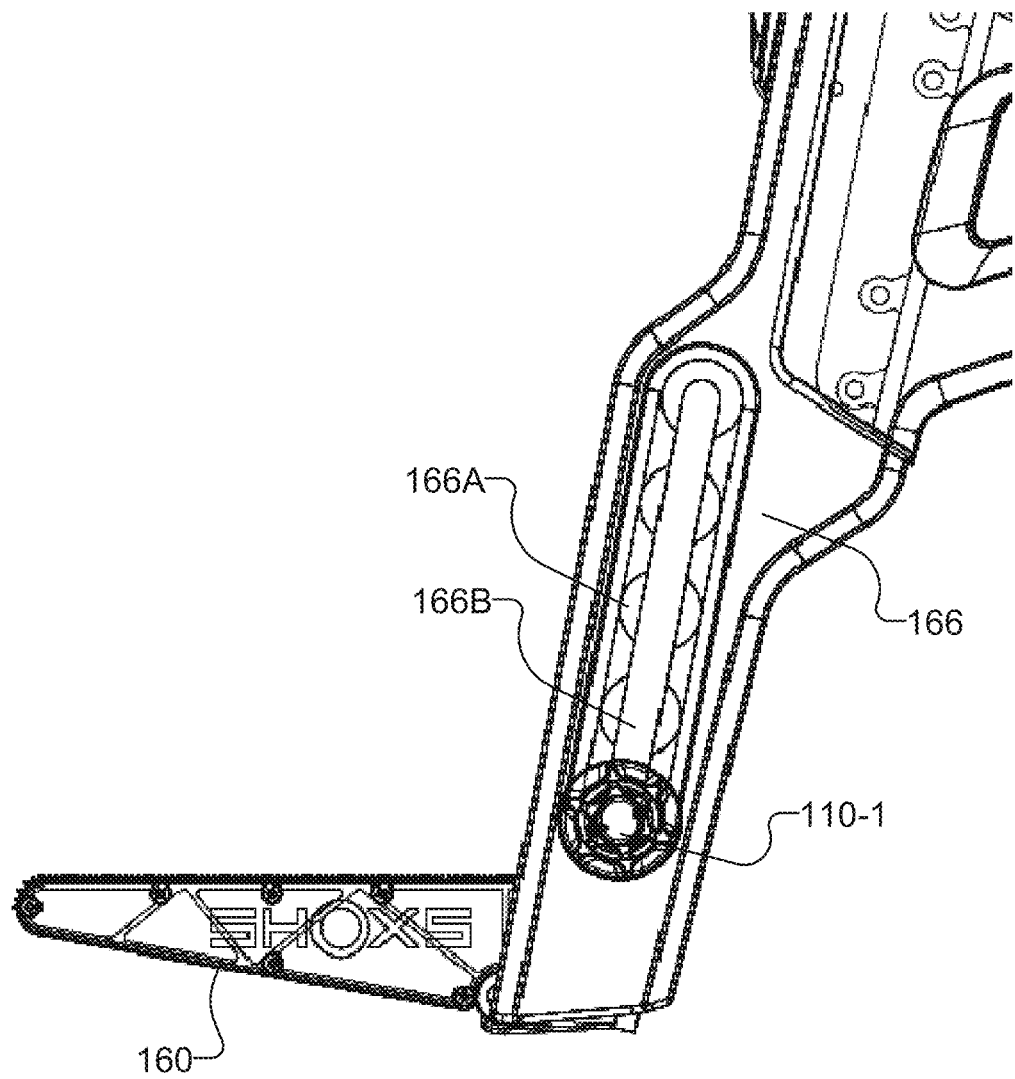
FIG. 8 is a magnified side view of a portion of the chair of FIG. 5.

As can be seen from FIG. 8, first footrest frame 166 defines a plurality of receiver cutouts 166A and a track aperture 166B similar to receiver cutouts 6A and track aperture 6B. Although not depicted, it should be understood that second footrest frame 168 defines a substantially similar plurality of receiver cutouts and a track aperture similar to receiver cutouts 166A and track aperture 166B.

In practice, to adjust the position of footrest 160, a user would first rotate the knobs of each of first and second locking positioning pin assemblies 110-1, 110-2 to cause their respective nuts to translate into their respective open positions. The user would then pull on each knob to disengage each plunger from their respective receiver cutouts. The user could then freely move footrest 160 relative to first and second footrest frames 166, 168 (except as limited by the interaction of the shafts of first and second locking positioning pin assemblies 110-1, 110-2 and the track apertures of first and second footrest frames 166, 168).

Once first and second locking positioning pin assemblies 110-1, 110-2 are aligned with desired receiver cutouts, the plungers of first and second locking positioning pin assemblies 110-1, 110-2 can be moved into the engaged position. The plungers may be forced into the engaged position by their respective biasing members or manually by a user. A user may subsequently rotate each knob 25 to move each nut into the closed position to thereby lock footrest 160 relative to first and second footrest frames 166, 168.

In some embodiments, one or more secondary pins, bearings or the like may be provided to protrude into and travel along track aperture 1666 (and the track aperture of second footrest frame 168) to prevent rotation of footrest 160 about the shafts of first and second locking positioning pin assemblies 110-1, 110-2.

It should be understood that a number of elements described and depicted herein could have substantially different shapes as compared to those described and depicted herein without reducing their functionality. For example, it is not necessary for nut 20 to have the depicted external shape as long as the internal shape of knob 25 is complementary or at least partially complementary to the external shape of nut 20 (or some other feature is provided to cause nut 20 to rotate with knob 25).

Interpretation of Terms

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof; elements which are integrally formed may be considered to be connected or coupled;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (e.g. a knob, nut, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described herein. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A position adjustment mechanism comprising:
a first component, the first component defining a track aperture extending in a first direction and a plurality of receiver cutouts spaced apart along the track aperture wherein each of the plurality of receiver cutouts has a second direction width that is larger than a second direction width of the track aperture, the second direction orthogonal to the first direction;
a second component selectively fixable relative to the first component by a locking positioning pin assembly, the locking positioning pin assembly comprising:
a shaft attached to the second component at a first end of the shaft, the shaft protruding through the track aperture, the shaft having a second end opposite the first end and the shaft translatable in the first direction within the track aperture to allow translation of the second component relative to the first component in the first direction;
a nut threadably engaged with the shaft and rotatable to thread along the shaft between:
a closed position relatively closer to the first end of the shaft; and
an open position relatively further from the first end of the shaft;
a knob rotatable about the shaft to cause rotation of the nut; and
wherein:
when the nut is in the open position, the knob is translatable relative to the shaft and the nut to allow a plunger to move between a disengaged position relatively further from the first end of the shaft and an engaged position relatively closer to the first end of the shaft;
when the nut is in the closed position, the plunger is forced into an engaged position and is prevented from moving into the disengaged position due to abutment of one or more features of the knob with one or more features of the nut; and
when the plunger is in the engaged position and the plunger protrudes into one of the plurality of receiver cutouts, abutment of the plunger with one or more edges of the one of the plurality of receiver cutouts prevents relative movement of the first component and the second component.

2. A position adjustment mechanism according to claim 1 wherein the first component comprises a chair and the second component comprises a foot rest.

3. A position adjustment mechanism according to claim 1 wherein the locking positioning pin assembly comprises a biasing member to bias the plunger into the engaged position.

4. A position adjustment mechanism according to claim 3 wherein when the nut is in the open position and the locking positioning pin assembly is aligned with the one of the plurality of receiver cutouts, the biasing member biases the plunger into the one of the one or more receiver cutouts.

5. A position adjustment mechanism according to claim 4 wherein when the nut is in the open position, the plunger may be translated into the disengaged position to allow relative movement between the first and second components by applying a force to the knob that overcomes the bias of the biasing member.

6. A position adjustment mechanism according to claim 1 wherein the receiver aperture extends entirely through the second component in a third direction orthogonal to the first and second directions and at least one of the plurality of receiver cutouts does not extend entirely through the second component in the third direction.

7. A position adjustment mechanism according to claim 1 wherein the plunger is rotatable about the shaft independently of rotation of the knob.

8. A position adjustment mechanism according to claim 1 wherein a cross-section of the plunger in a plane defined by the first and second directions is rectangular.

9. A position adjustment mechanism according to claim 1 wherein a cross-section of the plunger in a plane defined by the first and second directions is complementary to a cross section of at least one of the one or more receiver cutouts in the plane defined by the first and second directions.

10. A position adjustment mechanism according to claim 1 wherein an exterior surface of the nut is complementary to an interior surface of the knob.

11. A position adjustment mechanism according to claim 1 wherein the one or more features of the nut comprise one or more splines protruding in a radial direction away from the shaft.

12. A position adjustment mechanism according to claim 1 wherein the one or more features of the nut comprises a keyseat defined by an exterior surface of the nut for receiving at least a part of a key, wherein:
the key is also at least partially received in a corresponding keyway defined by an interior surface of the knob; and
the abutment of the key with the keyseat and the exterior surface of the nut prevents relative rotation between the nut and the knob.

13. A locking positioning pin assembly comprising:
a shaft extending in a first direction between first and second ends;
a nut threadably engaged with the shaft and rotatable to thread along the shaft between:
  a closed position relatively closer to the first end of the shaft; and
  an open position relatively further from the first end of the shaft;
a knob rotatable about the shaft to cause rotation of the nut; and
wherein:
  when the nut is in the open position, the knob is translatable relative to the shaft and the nut to allow a plunger to move between a disengaged position relatively further from the first end of the shaft and an engaged position relatively closer to the first end of the shaft;
  when the nut is in the closed position, the plunger is forced into an engaged position and is prevented from moving into the disengaged position due to abutment of one or more features of the knob with one or more features of the nut.

14. A locking positioning pin assembly according to claim 13 wherein the locking positioning pin assembly comprises a biasing member to bias the plunger into the engaged position.

15. A locking positioning pin assembly according to claim 13 wherein the plunger is rotatable about the shaft independently of rotation of the knob.

16. A locking positioning pin assembly according to claim 13 wherein a cross-section of the plunger in a plane orthogonal to the first direction is rectangular.

17. A locking positioning pin assembly according to claim 13 wherein an exterior surface of the nut is complementary to an interior surface of the knob.

18. A locking positioning pin assembly according to claim 17 wherein an exterior surface of the nut comprises one or more splines.

19. A locking positioning pin assembly according to claim 13 wherein the one or more features of the nut comprise one or more splines protruding in a radial direction away from the shaft.

20. A locking positioning pin assembly according to claim 13 wherein the one or more features of the nut comprises a keyseat defined by an exterior surface of the nut for receiving at least a part of a key, wherein:
  the key is also at least partially received in a corresponding keyway defined by an interior surface of the knob; and
  the abutment of the key with the keyseat and the exterior surface of the nut prevents relative rotation between the nut and the knob.

* * * * *